(12) United States Patent
McLaughlin et al.

(10) Patent No.: US 9,569,738 B2
(45) Date of Patent: Feb. 14, 2017

(54) METHODS AND SYSTEMS FOR DEPLOYING A NAVIGATION TOOL ASSOCIATED WITH A CONTINUOUS IMPROVEMENT APPROACH FOR AN ENTERPRISE

(75) Inventors: Shirley (Dayde) W. McLaughlin, Kirkland, WA (US); Michael G. Roberts, Renton, WA (US); Jeffrey K. Hanada, Seattle, WA (US); Jan Bartko, Seattle, WA (US); Michael A. Littleton, Los Angeles, CA (US); Steven C. Holt, Woodinville, WA (US); Steven M. Patneaude, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 1468 days.

(21) Appl. No.: 12/198,701

(22) Filed: Aug. 26, 2008

(65) Prior Publication Data
US 2010/0058184 A1 Mar. 4, 2010

(51) Int. Cl.
| | |
|---|---|
| *G06F 3/048* | (2013.01) |
| *G06Q 10/06* | (2012.01) |
| *G06Q 10/10* | (2012.01) |
| *G06F 3/01* | (2006.01) |

(52) U.S. Cl.
CPC ........ *G06Q 10/06* (2013.01); *G06Q 10/06316* (2013.01); *G06Q 10/10* (2013.01); *G06Q 10/0633* (2013.01); *G06Q 10/06311* (2013.01)

(58) Field of Classification Search
CPC ........ G06F 3/048; G06F 3/0481; G06Q 10/10; G06Q 10/06316; G06Q 10/06311; G06Q 10/0633

USPC ................................ 715/705, 708, 716, 714
See application file for complete search history.

(56) References Cited

U.S. PATENT DOCUMENTS

| | | | | | |
|---|---|---|---|---|---|
| 5,517,663 | A | * | 5/1996 | Kahn .................... | G06F 3/0481 345/473 |
| 5,818,715 | A | * | 10/1998 | Marshall ............ | G06Q 10/0631 705/7.12 |
| 5,890,133 | A | * | 3/1999 | Ernst ...................... | G06Q 10/06 705/7.27 |
| 5,987,422 | A | * | 11/1999 | Buzsaki ........... | G06Q 10/06311 705/7.13 |

(Continued)

OTHER PUBLICATIONS

"Continuous improvement process". Wikipedia. http://en.wikipedia.org/wiki/Continuous_improvement_process. Printed Oct. 6, 2011, 3 pages.*

*Primary Examiner* — Nicholas Augustine
(74) *Attorney, Agent, or Firm* — Armstrong Teasdale LLP

(57) ABSTRACT

A computer-based method for accessing the various individual tools from multiple continuous improvement programs from a single user interface is described. The method includes generating a user interface with a plurality of selectable icons, each icon corresponding to a predefined continuous improvement (CI) cycle step, providing, upon receiving a user selection of one of the CI cycle steps, user selectable process steps to the user interface, providing, upon receiving a user selection of one of the process steps, user selectable tool choices to the user interface, and generating, upon receiving a user selection of one of the tool choices, at least one interactive user interface that provides at least one of an example of the tool choice and instructions relating to the use of the tool choice.

15 Claims, 18 Drawing Sheets

(56) References Cited

U.S. PATENT DOCUMENTS

| | | | | |
|---|---|---|---|---|
| 6,003,011 A * | 12/1999 | Sarin | ................... | G06Q 10/04 705/7.12 |
| 6,029,043 A | 2/2000 | Ho et al. | | |
| 6,099,320 A | 8/2000 | Papadopoulos | | |
| 6,213,780 B1 | 4/2001 | Ho et al. | | |
| 6,243,615 B1 * | 6/2001 | Neway | ................... | G06Q 10/06 700/108 |
| 6,295,061 B1 * | 9/2001 | Park | ................... | G06Q 30/0241 715/201 |
| 6,349,238 B1 * | 2/2002 | Gabbita | ................. | G06Q 10/10 700/100 |
| 6,527,556 B1 | 3/2003 | Koskinen | | |
| 6,535,907 B1 * | 3/2003 | Hachiya | ................... | H04L 51/18 345/473 |
| 6,587,668 B1 | 7/2003 | Miller et al. | | |
| 6,990,636 B2 * | 1/2006 | Beauchamp | ........... | G06Q 10/10 715/764 |
| 7,080,327 B1 * | 7/2006 | Bartz | ....................... | G06F 8/34 715/709 |
| 7,110,976 B2 | 9/2006 | Heimermann et al. | | |
| 7,114,037 B2 * | 9/2006 | Agarwal | ................. | G06Q 10/10 711/143 |
| 7,168,077 B2 * | 1/2007 | Kim | ....................... | G06Q 10/10 705/7.27 |
| 7,184,966 B1 * | 2/2007 | Parsonnet | ............. | G06Q 10/10 705/7.26 |
| RE39,942 E | 12/2007 | Fai et al. | | |
| 7,340,679 B2 * | 3/2008 | Botscheck | ........ | G06Q 10/06311 705/7.13 |
| 7,379,945 B1 * | 5/2008 | Hirsch | ................. | G06F 17/2241 |
| 7,581,011 B2 * | 8/2009 | Teng | ........................ | G06F 21/41 709/229 |
| 7,653,566 B2 * | 1/2010 | Kim | ................. | G06Q 10/06311 705/7.13 |
| 7,802,174 B2 * | 9/2010 | Teng | ........................ | G06F 21/41 715/200 |
| 2001/0049722 A1 * | 12/2001 | Bush | ............................ | 709/204 |
| 2002/0075293 A1 * | 6/2002 | Charisius | ............... | G06Q 10/06 715/704 |
| 2002/0129106 A1 | 9/2002 | Gutfreund | | |
| 2002/0138577 A1 * | 9/2002 | Teng | ........................ | G06F 21/41 709/205 |
| 2002/0146676 A1 | 10/2002 | Reynolds | | |
| 2003/0058267 A1 * | 3/2003 | Warren | ............. | G06F 17/30716 715/705 |
| 2003/0197733 A1 * | 10/2003 | Beauchamp | ........... | G06Q 10/10 715/764 |
| 2005/0149908 A1 * | 7/2005 | Klianev | ................. | G06F 9/5038 717/109 |
| 2005/0257136 A1 * | 11/2005 | Charisius | ............... | G06Q 10/06 715/230 |
| 2006/0020500 A1 | 1/2006 | Turner | | |
| 2007/0028169 A1 * | 2/2007 | Wessling | ....................... | 715/705 |
| 2007/0238077 A1 | 10/2007 | Strachar | | |
| 2008/0209417 A1 * | 8/2008 | Jakobson | ............... | G06F 9/4856 718/100 |
| 2008/0249816 A1 * | 10/2008 | Khalilian | ............... | G06Q 10/06 705/7.15 |

* cited by examiner

METHODS AND SYSTEMS FOR DEPLOYING A NAVIGATION TOOL ASSOCIATED WITH A CONTINUOUS IMPROVEMENT APPROACH FOR AN ENTERPRISE

BACKGROUND OF THE INVENTION

The field of the invention relates generally to continuous improvement processes, and more specifically, to methods and systems that provide a central enterprise framework to communicate and deploy one overarching continuous improvement approach.

Within a large enterprise, various approaches and continuous improvement strategies are developed and applied across the enterprise. Deployment of these various approaches and continuous improvement strategies are evidenced by, business processes and lists of tools are oriented around individual approaches, subject matter experts that are aligned by continuous improvement strategies, and training that is driven by specific continuous improvement strategies. Most of these improvement strategies are well known (i.e., Lean, Theory of Constraints, Six Sigma, etc.).

By not having one overarching continuous improvement approach, an enterprise is not able to leverage the intellectual capital across the company relative to continuous improvement. This inability to leverage impacts an enterprise's ability to innovate and produce their products and services with high quality, lower costs, and greater speed.

While analyzing the above described problems, it was recognized that multiple continuous improvement tools are used across an enterprise, generally with little standardization, creating confusion as to which tools, and thus which methods were best to perform continuous improvement. Symptoms of the problem include, for example, a perception that there are too many continuous improvement related tools, the tools were not well understood, the tools were not easily accessible by those that could benefit from use of the tool and associated methods, and the tools were not integrated in a common framework.

Some of the above described problems are at least partially addressed through one or more of: lists of continuous improvement tools that are oriented around individual methods, the above mentioned subject matter experts associated with a particular continuous improvement method, and the above mentioned training associated with the particular continuous improvement method.

The problems outlined above, as would be expected, generate less than the desired results in that: personnel have a difficult time finding the right tool for the continuous improvement job, personnel generally have to call an expert in the particular continuous improvement method/tool resulting in possible delays and/or an inappropriate application of the continuous improvement tool. As a result, the speed at which employees could resolve problems and make improvements is constrained.

BRIEF DESCRIPTION OF THE INVENTION

In one aspect, a computer-based method for accessing the various individual tools from multiple continuous improvement programs from a single user interface is provided. The method includes generating a user interface with a plurality of selectable icons, each icon corresponding to a predefined continuous improvement (CI) cycle step, providing, upon receiving a user selection of one of the CI cycle steps, user selectable process steps to the user interface, providing, upon receiving a user selection of one of the process steps, user selectable tool choices to the user interface, and generating, upon receiving a user selection of one of the tool choices, at least one interactive user interface that provides at least one of an example of the tool choice and instructions relating to the use of the tool choice.

In another aspect, a system configured to provide interactive user navigation to individual tools from multiple continuous improvement programs is provided. The system includes at least one electronic database capable of storing electronic information, wherein the stored electronic information includes one or more files and/or references to files that contain data relating to each of the individual tools from the continuous improvement programs, a graphical user interface (GUI) operable by a user to access the individual tools through a series of selectable icons, the series of selectable icons including predefined continuous improvement (CI) cycle step icons, process step icons, and tool choice icons, and a processing element responsive to the selection of the selectable icons, wherein the processing element is further configured to cause process step icons associated with a selected CI cycle step icon to be displayed at the GUI, cause tool choice icons associated with a selected process step to be displayed at the GUI, and cause at least one of an example of the tool choice and instructions relating to the use of the tool choice to be displayed at the GUI upon receipt of a tool choice via the GUI.

In still another aspect, a method for providing information to a user regarding available continuous improvement tools is provided. The method includes organizing a plurality of individual tools each associated with one or more continuous improvement programs around a pre-defined continuous improvement cycle model, providing access to the individual tools via a icon-based user interface based on the continuous improvement cycle model, and delivering education and training for the individual tools through the user access of data associated with each individual tool, the user access via the user interface.

DETAILED DESCRIPTION OF THE INVENTION

The embodiments described herein recognize that a central enterprise framework is required to communicate and deploy one overarching continuous improvement approach for an enterprise. A web-based system is utilized and has the technical effect of providing a roadmap for implementation and use of a continuous improvement approach that combines the features of multiple continuous approaches utilized within an enterprise. This roadmap, as is further described herein, provides the single interactive resource and a central framework to allow for standardization of continuous improvement. More specifically, the web-based system and the roadmap are operable to display a plurality of interactive tools, arranged in roadmap fashion, for the purpose of deploying company policy, for example via an intranet associated with the enterprise.

The roadmap is an interactive policy engagement product, providing a single resource for all employees of an enterprise to learn about the elements of the overarching continuous improvement approach for the enterprise, as well as providing access to education, training, information, continuous improvement tools and resources to execute the continuous improvement approach.

The systems and processes are not limited to the specific embodiments described herein. In addition, components of each system and each process can be practiced independent and separate from other components and processes described herein. Each component and process also can be used in combination with other assembly packages and processes.

Figure 1:
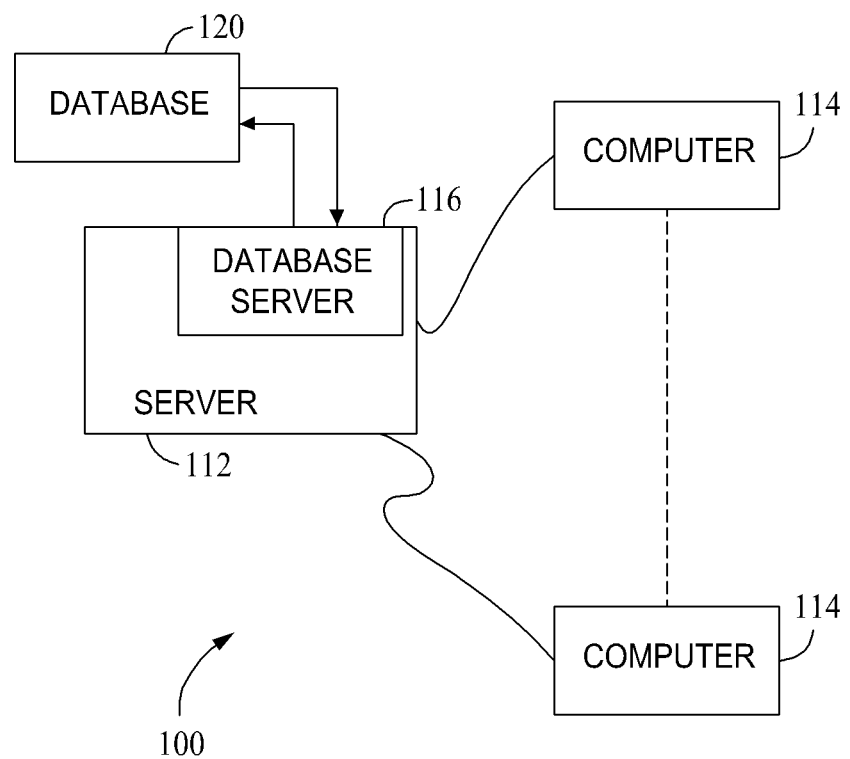
FIG. 1 is a simplified block diagram of an exemplary embodiment of a server architecture of a system in accordance with one embodiment of the present invention.

FIG. 1 is a simplified block diagram of an exemplary system 100 in accordance with one embodiment of the present invention. In one embodiment, system 100 is a web-based system used for implementing the above mentioned roadmap along with the tools that are utilized in association with the roadmap, and is operable to implement continuous improvement techniques across an enterprise. In addition, system 100 is operable as a training system, which can be utilized by users for training in the use of the above mentioned roadmap and tools associated with the roadmap.

More specifically, in the example embodiment, system 100 includes a server system 112, and a plurality of client sub-systems, also referred to as client systems 114, connected to server system 112. In one embodiment, client systems 114 are computers including a web browser, such that server system 112 is accessible to client systems 114 using the Internet. Client systems 114 are interconnected to the Internet through many interfaces including a network, such as a local area network (LAN) or a wide area network (WAN), dial-in-connections, cable modems, special high-speed ISDN lines, and wireless interfaces. Client systems 114 could be any device capable of interconnecting to the Internet including a web-based phone, personal digital assistant (PDA), or other web-based connectable equipment. A database server 116 is connected to a database 120 containing information on a variety of matters, as described below in greater detail. In one embodiment, centralized database 120 is stored on server system 112 and can be accessed by potential users at one of client systems 114 by logging onto server system 112 through one of client systems 114. In an alternative embodiment, database 120 is stored remotely from server system 112 and is configured to store data relating to the continuous improvement approach for an enterprise.

Figure 2:
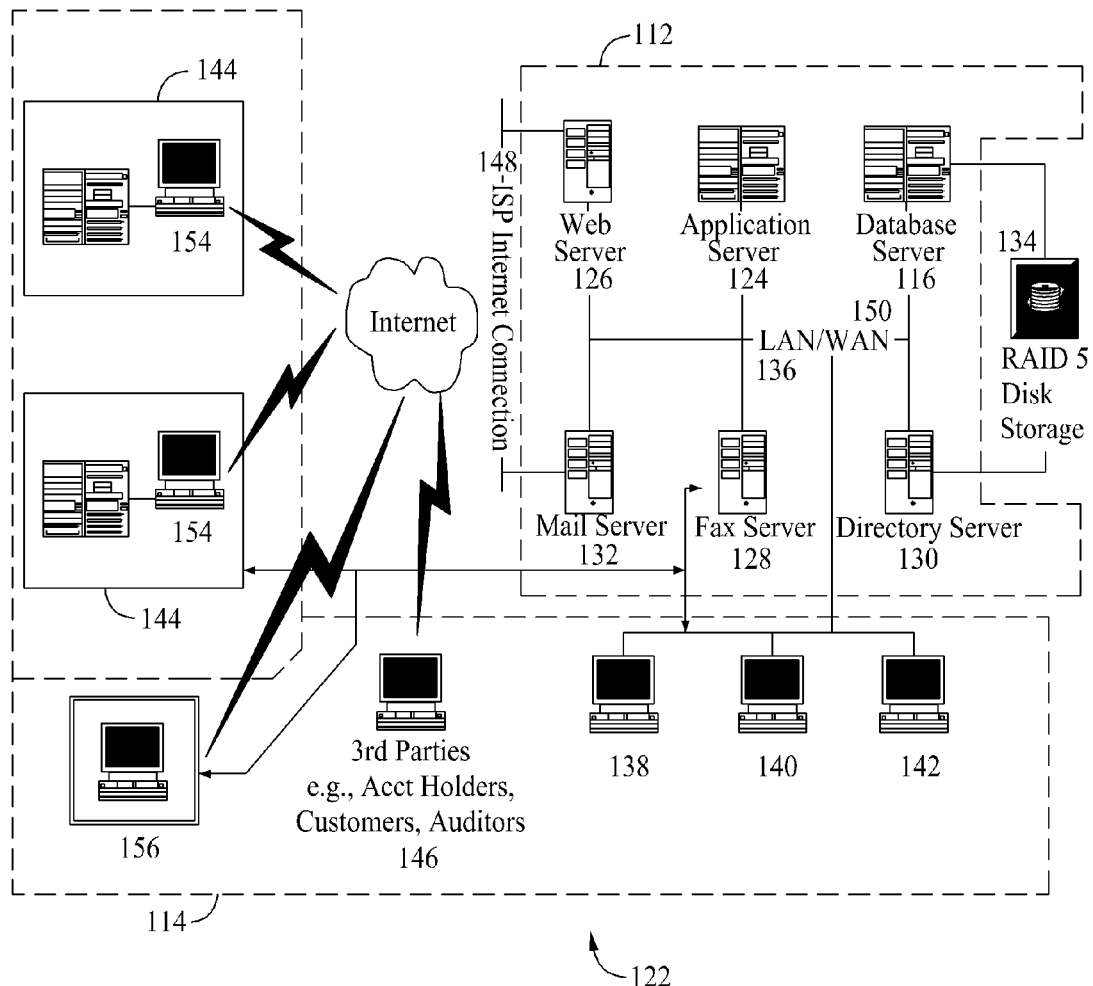
FIG. 2 is an expanded block diagram of an exemplary embodiment of a server architecture of a system in accordance with one embodiment of the present invention.

FIG. 2 is an expanded block diagram of an exemplary embodiment of a server architecture of a system 122 in accordance with one embodiment of the present invention. Components in system 122, identical to components of system 100 (shown in FIG. 1), are identified in FIG. 2 using the same reference numerals as used in FIG. 1. System 122 includes server system 112 and client systems 114. Server system 112 further includes database server 116, an application server 124, a web server 126, a fax server 128, a directory server 130, and a mail server 132. A disk storage unit 134 is coupled to database server 116 and directory server 130. Servers 116, 124, 126, 128, 130, and 132 are coupled in a local area network (LAN) 136. In addition, a system administrator's workstation 138, a user workstation 140, and a supervisor's workstation 142 are coupled to LAN 136. Alternatively, workstations 138, 140, and 142 are coupled to LAN 136 using an Internet link or are connected through an Intranet. In certain embodiments, one or more of the interconnections may be via a wireless interface.

In one embodiment, each workstation, 138, 140, and 142 is a personal computer having a web browser. In other embodiments, other devices, such as PDAs, web-based phones, and the like may be used as a user interface to system 122. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees 144 and to third parties, e.g., account holders, customers, auditors, etc., 146 using an ISP Internet connection 148. The communication in the exemplary embodiment is illustrated as being performed using the Internet, however, any other wide area network (WAN) type communication can be utilized in other embodiments, i.e., the systems and processes are not limited to being practiced using the Internet. In addition, and rather than WAN 150, local area network 136 could be used in place of WAN 150. Finally employees 144 may utilize any device capable of interconnecting to the Internet including a web-based phone, personal digital assistant (PDA), or other web-based connectable equipment.

In the exemplary embodiment, any authorized individual having a workstation 154 can access system 122. At least one of the client systems includes a manager workstation 156 located at a remote location. Workstations 154 and 156 are personal computers having a web browser. Also, workstations 154 and 156 are configured to communicate with server system 112. Furthermore, fax server 128 communicates with remotely located client systems, including a client system 156 using a telephone link. Fax server 128 is configured to communicate with other client systems 138, 140, and 142 as well.

Figure 3:
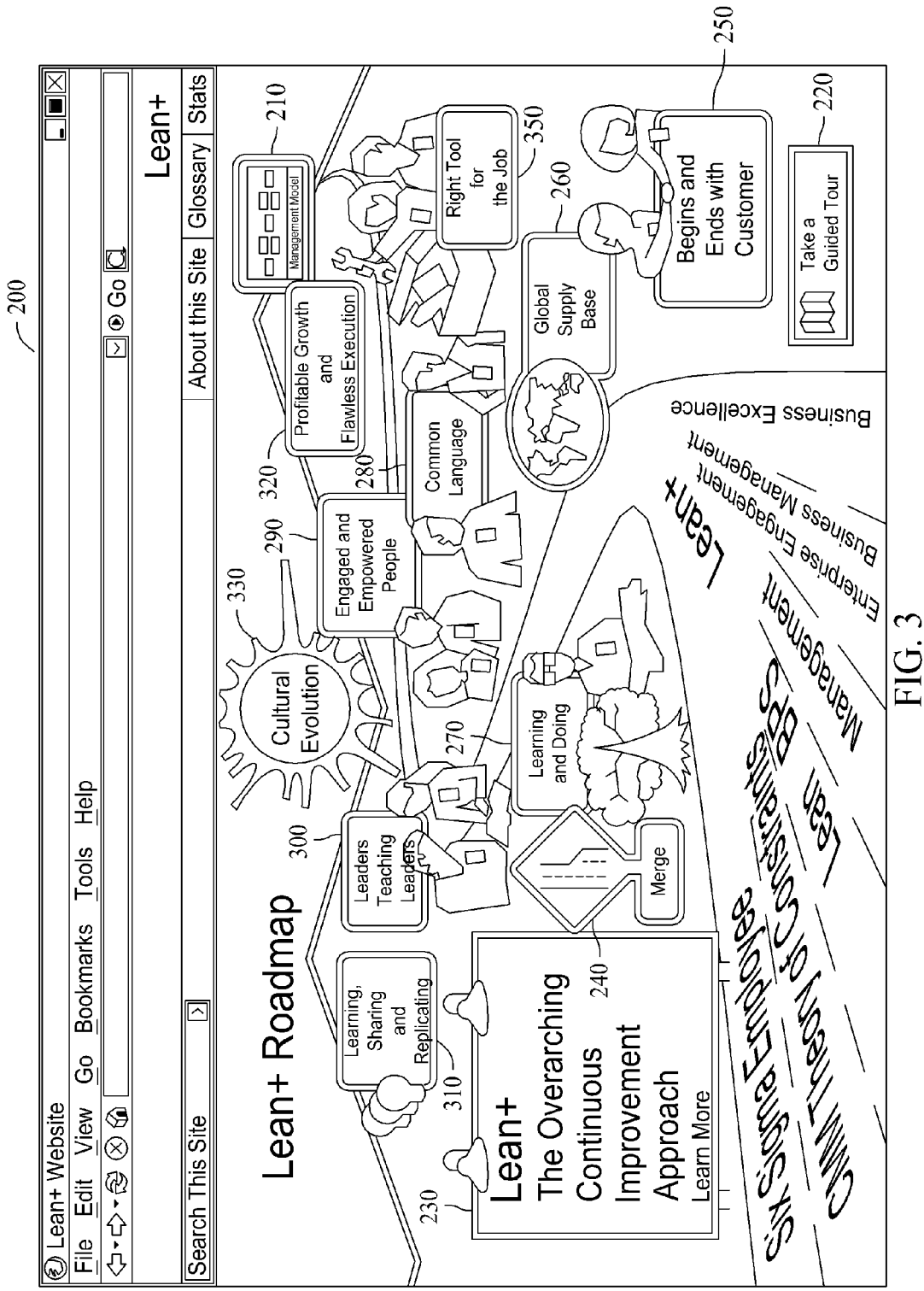
FIG. 3 is an illustration of one embodiment of a roadmap for an overarching continuous improvement approach of an enterprise.

FIG. 3 is a user interface 200, illustrating one embodiment of a roadmap 210 for implementation and use of a continuous improvement approach. In one embodiment, the roadmap 210 is configured for all employees, within all work environments of an enterprise. In alternative embodiments, information for particular employee groups, such as managers, is isolated so that such information cannot be accessed by all employees. Roadmap 210 includes a plurality of icons, as illustrated in FIG. 3. Through user selection of a roadmap icon, an introduction of the icon is provided as well as other supporting information, including, but not limited to videos, audio, links, and other references. Through selection of the various icons in roadmap 210, a user is able to display a plurality of interactive tools, receive information on applicable multi-disciplined continuous improvement tools on one software application, and interactively reevaluate and reiterate other applicable continuous improvement tools. From the perspective of the enterprise, employee education, training, engagement, and policy deployment are achieved as well as the creation of a standard centralized enterprise framework that organizes the elements of the enterprise's overarching continuous improvement approach.

Roadmap 210 provides a common integrated approach to continuous improvement, with access to sets of multi-discipline process improvement tools, methods, information, networking, education and training across an enterprise. In corporation of a system that incorporates the elements of the roadmap described further herein helps to accelerate long-term growth and productivity, distinguish an enterprise from its competitors, and enables the enterprise to deliver high levels of customer satisfaction.

Utilization of the roadmap approach to continuous improvement builds on bringing the best of an enterprise together, providing a common approach for continuous improvement. Having a common understanding of the elements of the enterprise's continuous improvement approach, via a common source enables higher quality in the daily work of the enterprise's employees, which drives higher quality in their products and services, in addition to meeting customer expectations of working more efficiently and effectively. The roadmap approach eliminates redundancies and waste.

The embodiment of roadmap 210 illustrated in FIG. 3 includes the following selectable icons: a guided tour icon 220 for accessing a guided tour of the continuous improvement roadmap, a Lean+ icon 230 for accessing an introduction to the overarching continuous improvement approach of the enterprise, a merge icon 240, a begins and ends with customer icon 250, a global supply base icon 260, a learning and doing icon 270, a common language icon 280, an engaged and empowered people icon 290, a leaders teaching leaders icon 300, a learning, sharing and replicating icon 310, a profitable growth and flawless execution icon 320, a cultural evolution icon 330, and a right tool for the right job icon 350. A user interface that is associated with the right tool for the right job icon 350, as further described below is sometimes referred to as a navigation tool or NavTool. Functionality associated with the above listed icons is further described below with respect to the corresponding figures.

Figure 4:
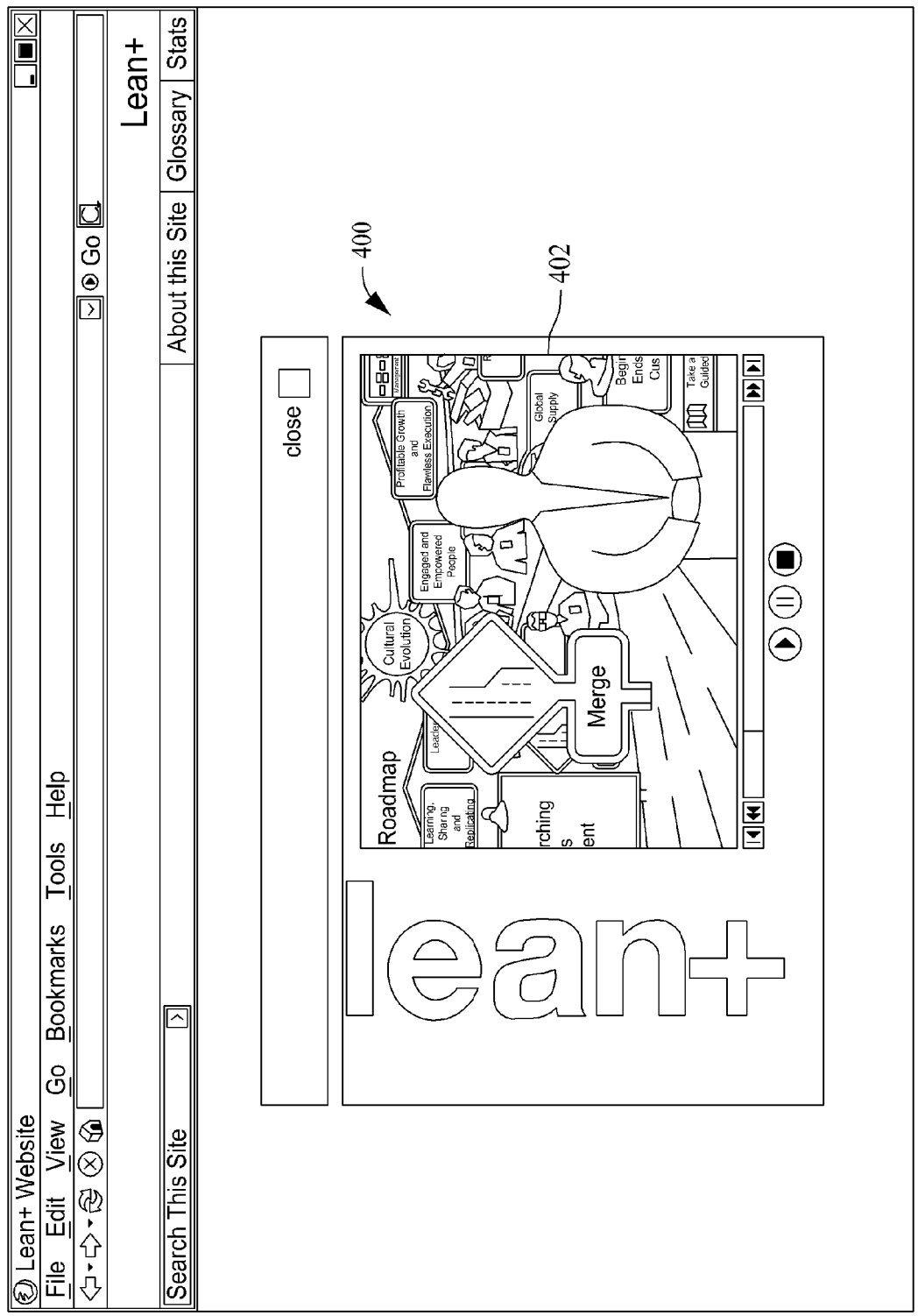
FIG. 4 is a user interface for accessing a guided tour of the continuous improvement roadmap.

FIG. 4 is a user interface 400 for accessing a guided tour of the continuous improvement roadmap that is accessible from the roadmap 210 in the user interface 200 of FIG. 3 through selection of the guided tour icon 220. In the illustrated embodiment, the guided tour is in the form of an online video 402 that can be viewed by the user. In certain embodiments, user interface 400 may be configured to include frequently asked questions and speaker notes.

Figure 5:
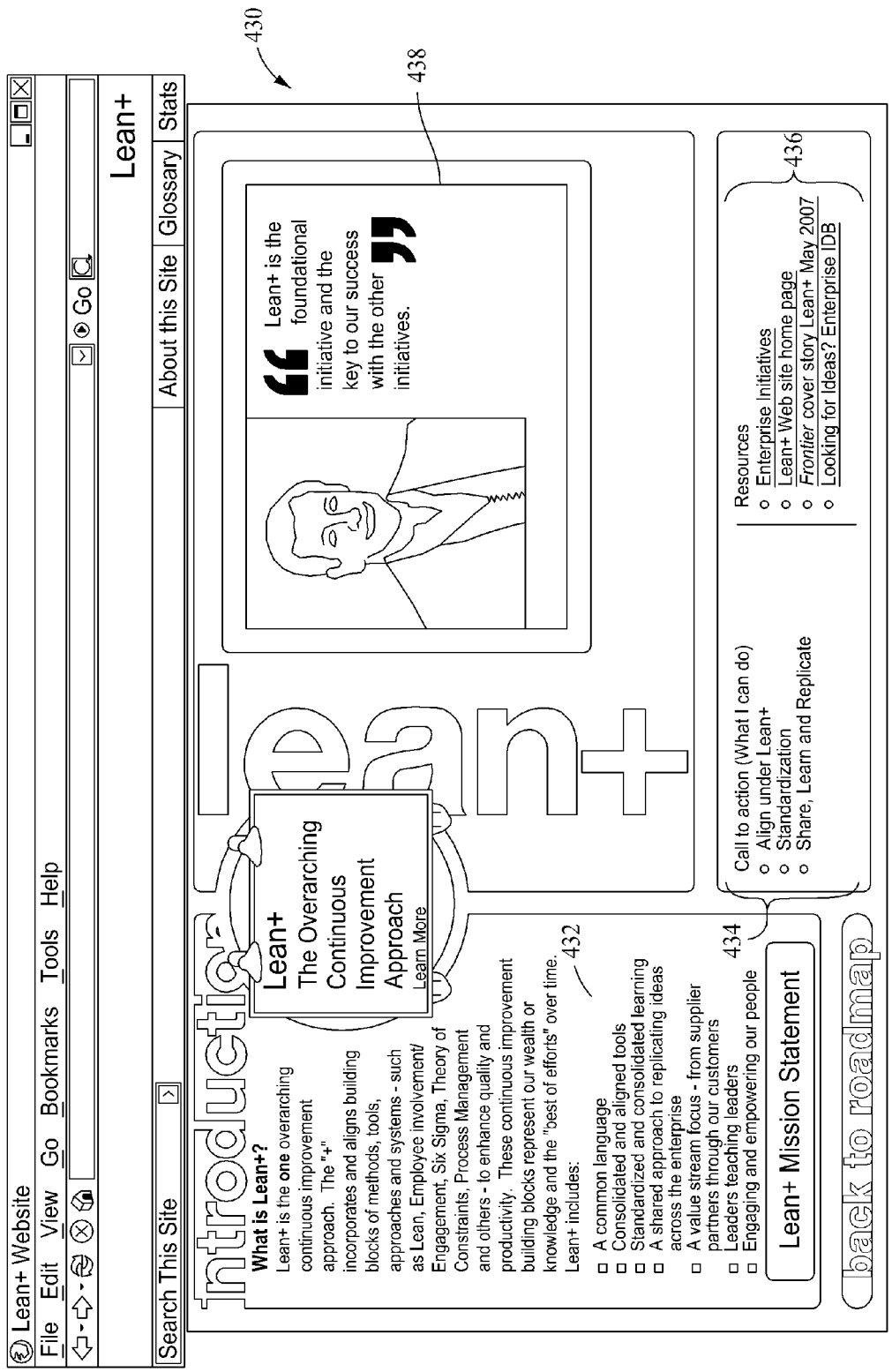
FIG. 5 is a user interface for accessing an introduction to the overarching continuous improvement approach of the enterprise.

FIG. 5 is a user interface 430 for accessing an introduction to the overarching continuous improvement approach of the enterprise that is accessible from the roadmap 210 in the user interface 200 of FIG. 3 through selection of the Lean+ icon 230. User interface 430 includes a definition 432 of the Lean+ approach, selectable calls to action 434, and selectable resources 436. An online video 438 may provide a portion of the introduction to the Lean+ approach to continuous improvement. As described herein, Lean+ is an approach for combining the elements of multiple continuous improvement approaches.

Figure 6:
FIG. 6 is a user interface for accessing an introduction to continuous improvement approaches that in combination make up the overarching continuous improvement approach of an enterprise.

FIG. 6 is a user interface 460 for accessing an introduction to continuous improvement that in combination make up the overarching continuous improvement approach of the enterprise. The user interface 460 is accessible from the roadmap 210 in the user interface 200 of FIG. 3 through selection of the merge icon 240. User interface 460 includes a summary 462 of the Lean+ approach, and selectable calls to action 464. An online video 468 may provide a portion of the introduction to continuous improvement.

Figure 7:
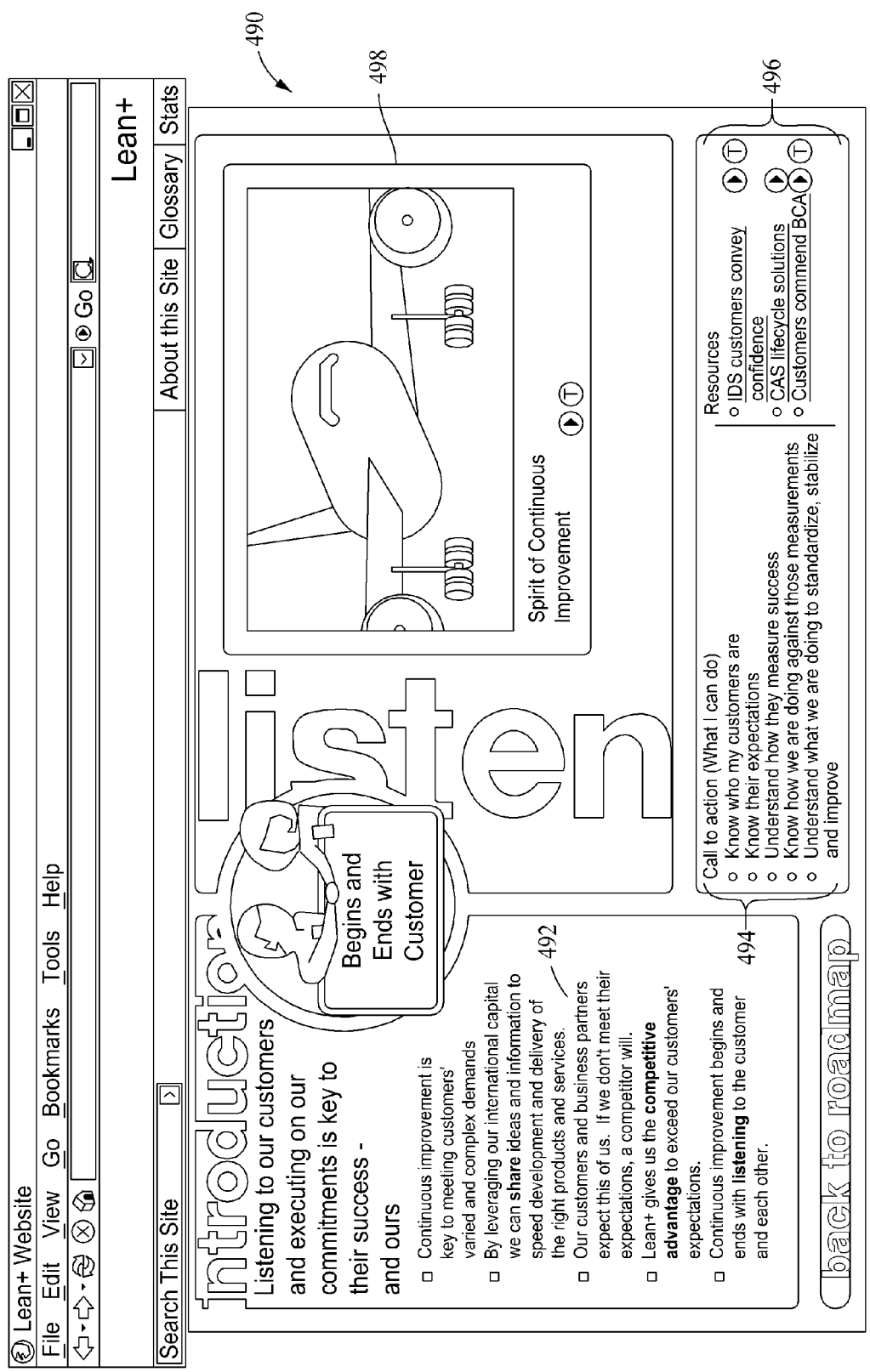
FIG. 7 is a user interface for accessing an introduction to the customer oriented focus that form a portion of the overarching continuous improvement approach of the enterprise.

FIG. 7 is a user interface 490 for accessing an introduction to the customer oriented focus that form a portion of the overarching continuous improvement approach of the enterprise. The user interface 490 is accessible from the roadmap 210 in the user interface 200 of FIG. 3 through selection of the begins and ends with customer icon 250. User interface 490 includes an introduction 492 to customer focus under the Lean+ approach, selectable calls to action 494, and selectable resources 496. An online video 498 may provide a portion of the introduction to the customer focus of the Lean+ approach to continuous improvement.

Figure 8:
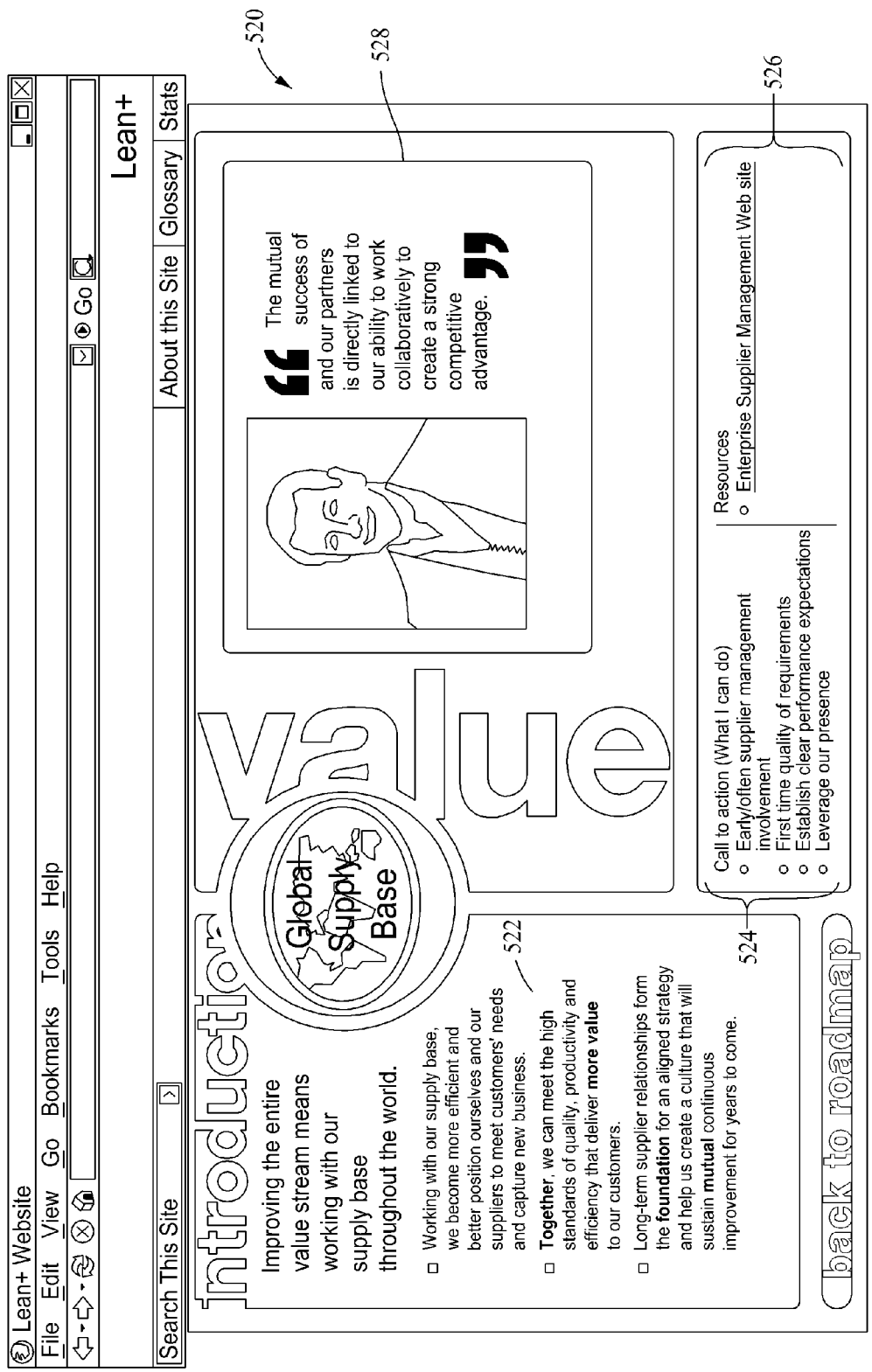
FIG. 8 is a user interface for accessing an introduction to the global supply base issues that form a portion of the overarching continuous improvement approach of the enterprise.

FIG. 8 is a user interface 520 for accessing an introduction to the global supply base issues that form a portion of the overarching continuous improvement approach of the enterprise. The user interface 520 is accessible from the roadmap 210 in the user interface 200 of FIG. 3 through selection of the global supply base icon 260. User interface 520 includes an introduction 522 to a global supply base under the Lean+ approach, selectable calls to action 524, and selectable resources 526. An online video 528 may provide a portion of the introduction to the global supply base portion of the Lean+ approach to continuous improvement.

Figure 9:
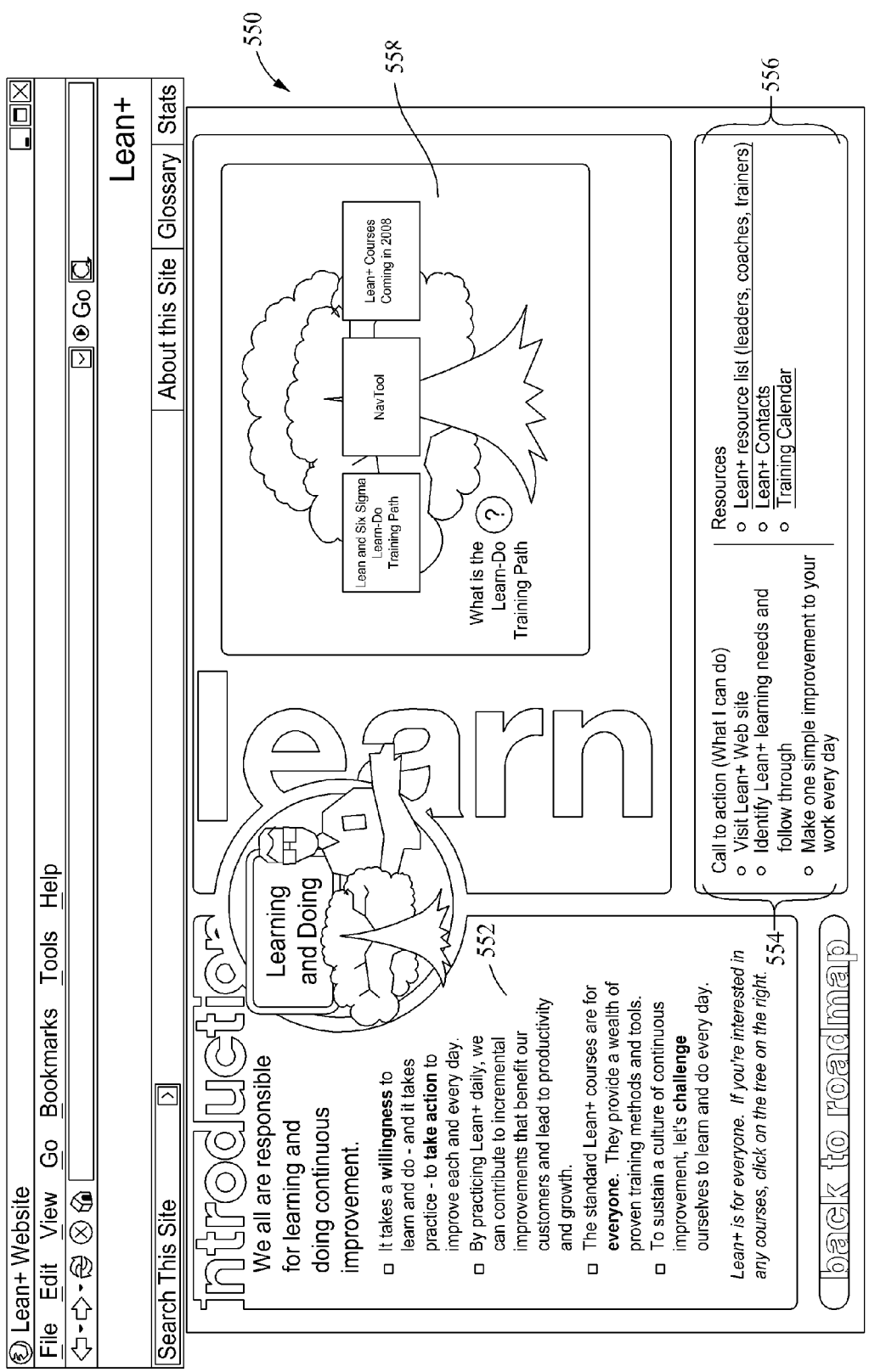
FIG. 9 is a user interface for accessing an introduction to the learning and doing focus that forms a portion of the overarching continuous improvement approach of the enterprise.

FIG. 9 is a user interface 550 for accessing an introduction to the learning and doing focus that form a portion of the overarching continuous improvement approach of the enterprise. The user interface 550 is accessible from the roadmap 210 in the user interface 200 of FIG. 3 through selection of the learning and doing icon 270. User interface 550 includes an introduction 552 to learning and doing continuous improvement under the Lean+ approach, selectable calls to action 554, and selectable resources 556. An online video 558 may provide a portion of the introduction to the learning and doing portion of the Lean+ approach to continuous improvement.

Figure 10:
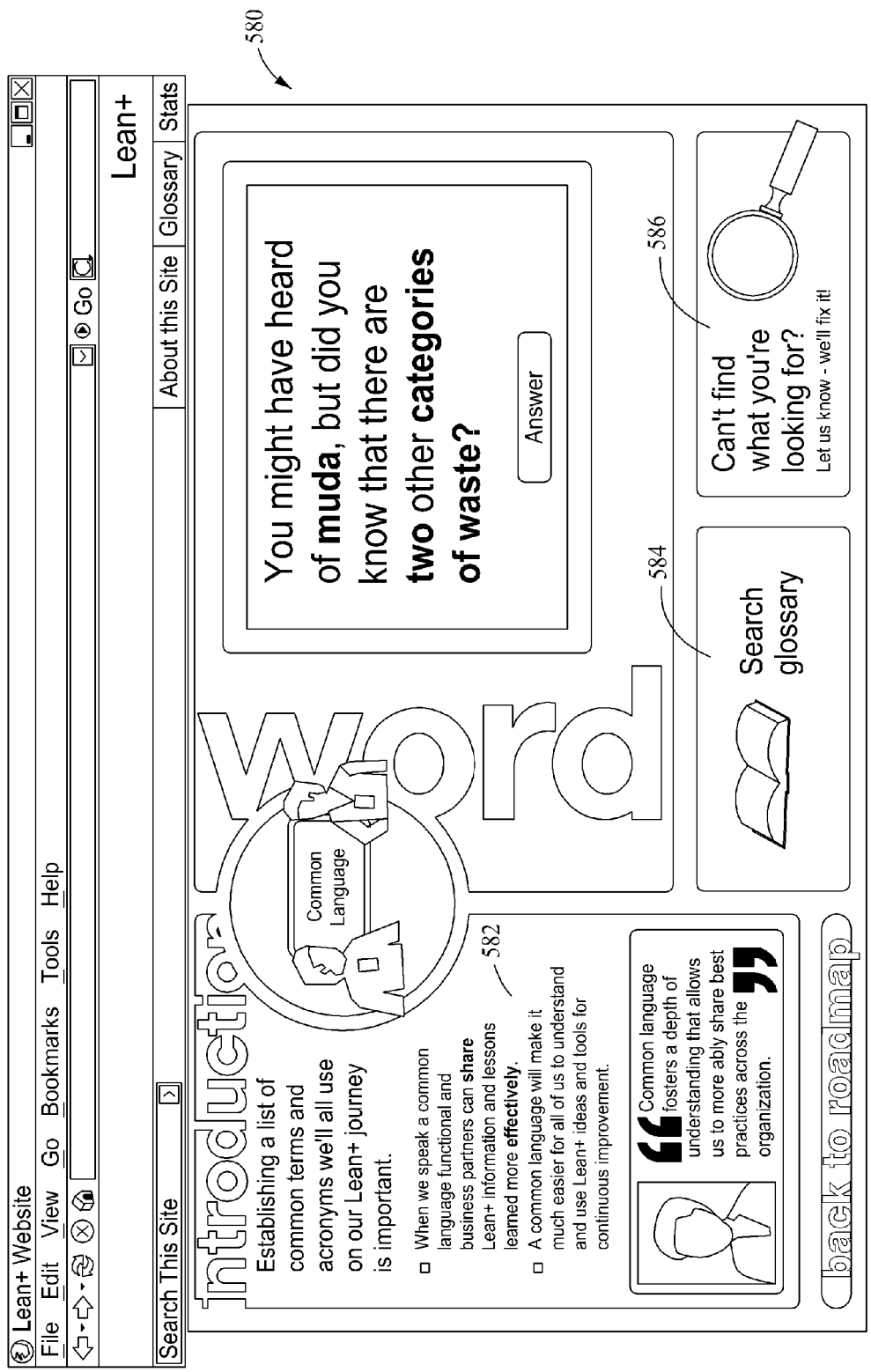
FIG. 10 is a user interface for accessing an introduction to the common language focus that forms a portion of the overarching continuous improvement approach of the enterprise.

FIG. 10 is a user interface 580 for accessing an introduction to the common language focus that form a portion of the overarching continuous improvement approach of the enterprise. The user interface 580 is accessible from the roadmap 210 in the user interface 200 of FIG. 3 through selection of the common language icon 280. User interface 580 includes an introduction 582 to common language under the Lean+ approach, a selectable search glossary icon 584, and a selectable problem notification icon 586. An online video 588 may provide a portion of the introduction to the common language portion of the Lean+ approach to continuous improvement.

Figure 11:
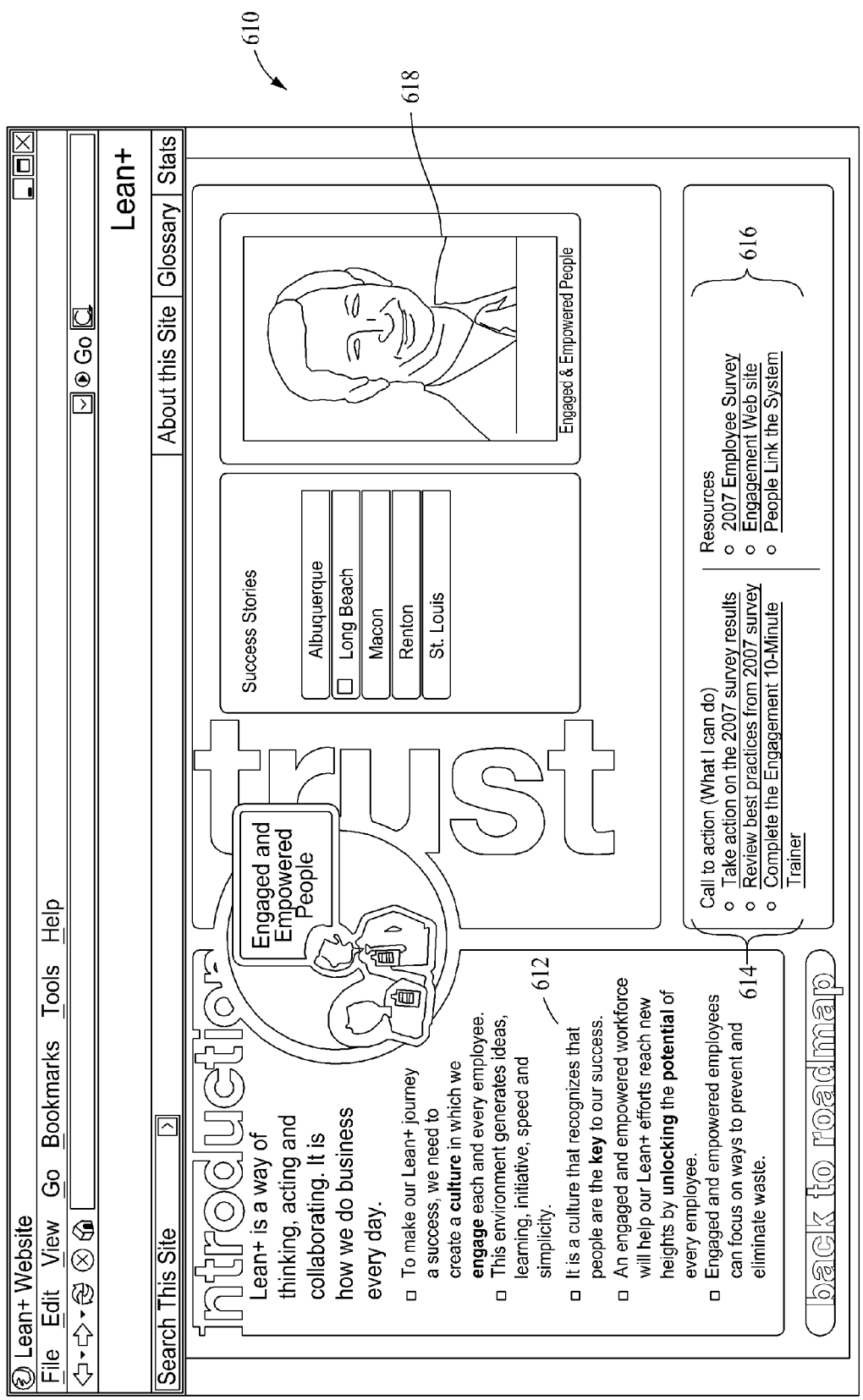
FIG. 11 is a user interface for accessing an introduction to the engagement and empowerment of employees that forms a portion of the overarching continuous improvement approach of the enterprise.

FIG. 11 is a user interface 610 for accessing an introduction to the engagement and empowerment of employees that forms a portion of the overarching continuous improvement approach of the enterprise. The user interface is accessible from the roadmap 210 in the user interface 200 of FIG. 3 through selection of the learning and doing icon 290. User interface 610 includes an introduction 612 to engagement and empowerment of employees under the Lean+ approach, selectable calls to action 614, and selectable resources 616. An online video 618 may provide a portion of the introduction to the engaged and empowered people portion of the Lean+ approach to continuous improvement.

Figure 12:
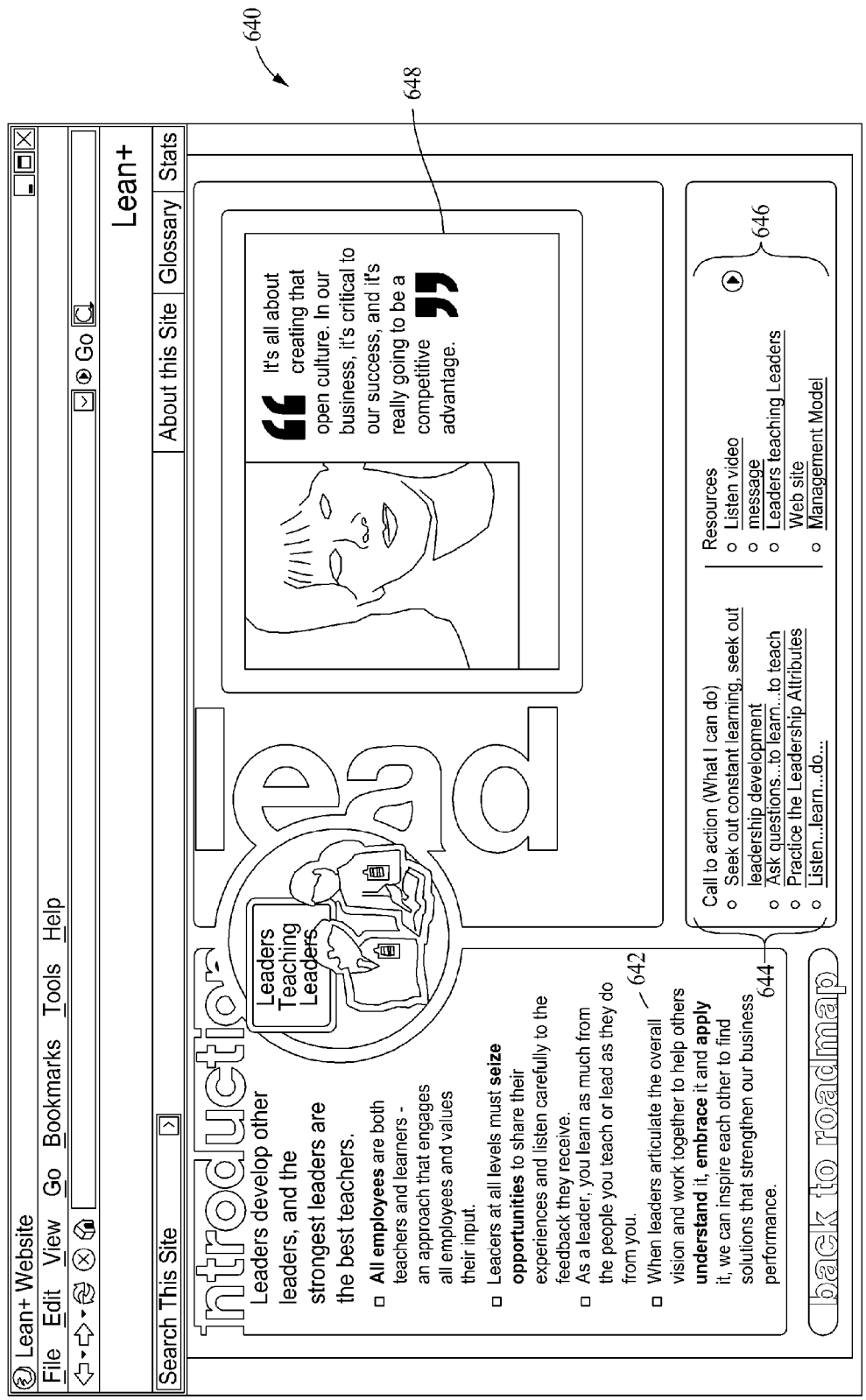
FIG. 12 is a user interface for accessing an introduction to leader development that forms a portion of the overarching continuous improvement approach of the enterprise.

FIG. 12 is a user interface 640 for accessing an introduction to leader development that forms a portion of the overarching continuous improvement approach of the enterprise. The user interface 640 is accessible from the roadmap 210 in the user interface 200 of FIG. 3 through selection of the leaders teaching leaders icon 300. User interface 640 includes an introduction 612 to leader development of employees under the Lean+ approach, selectable calls to action 644, and selectable resources 646. An online video 648 may provide a portion of the introduction to the leaders teaching leaders portion of the Lean+ approach to continuous improvement.

Figure 13:
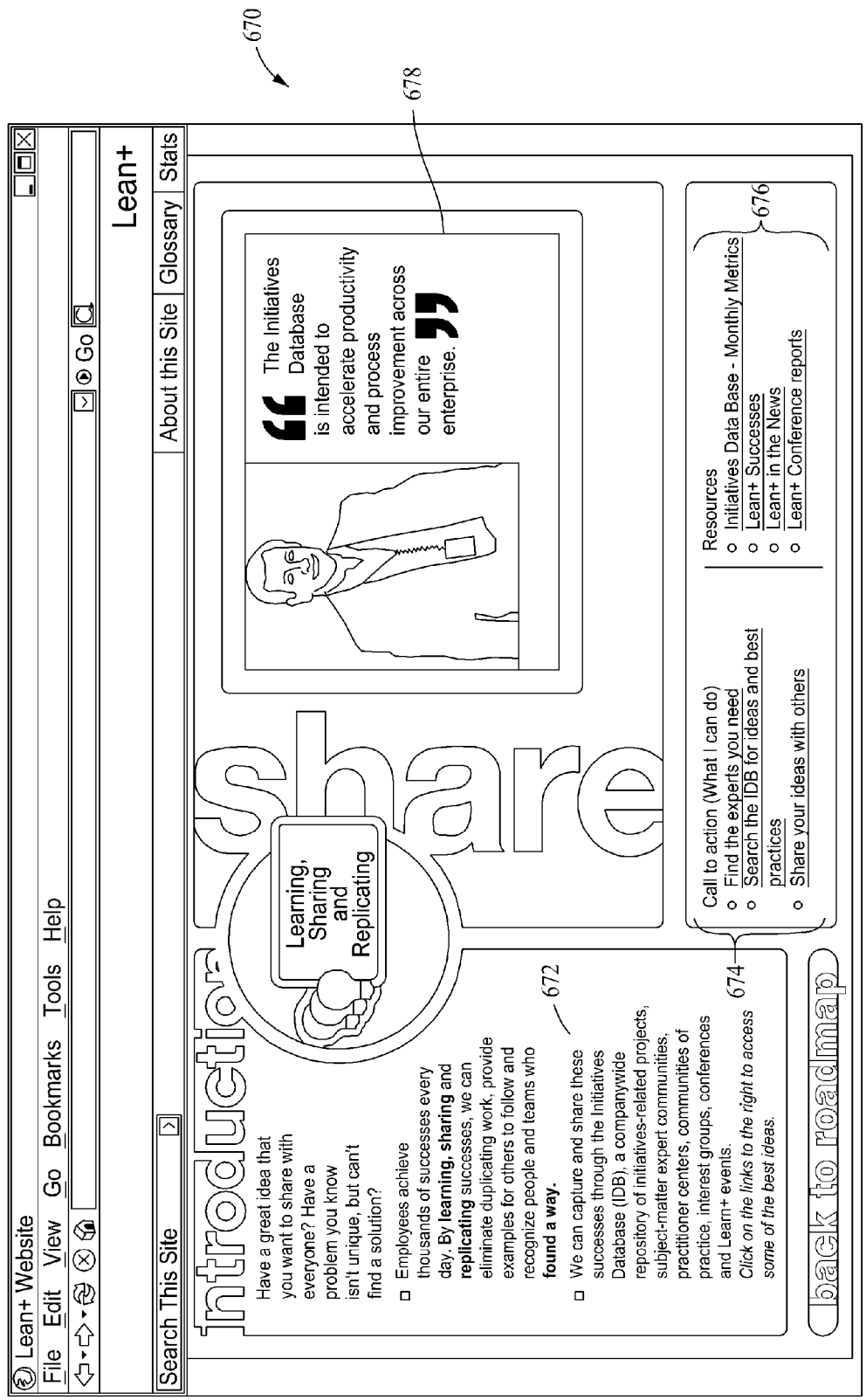
FIG. 13 is a user interface for accessing an introduction to sharing ideas focus that forms a portion of the overarching continuous improvement approach of the enterprise.

FIG. 13 is a user interface 670 for accessing an introduction to sharing ideas focus that forms a portion of the overarching continuous improvement approach of the enterprise. The user interface 670 is accessible from the roadmap 210 in the user interface 200 of FIG. 3 through selection of the learning, sharing and replicating icon 310. User interface 670 includes an introduction 672 to idea sharing and learning among employees under the Lean+ approach, selectable calls to action 674, and selectable resources 676. An online video 678 may provide a portion of the introduction to the learning, sharing, and replicating portion of the Lean+ approach to continuous improvement.

Figure 14:
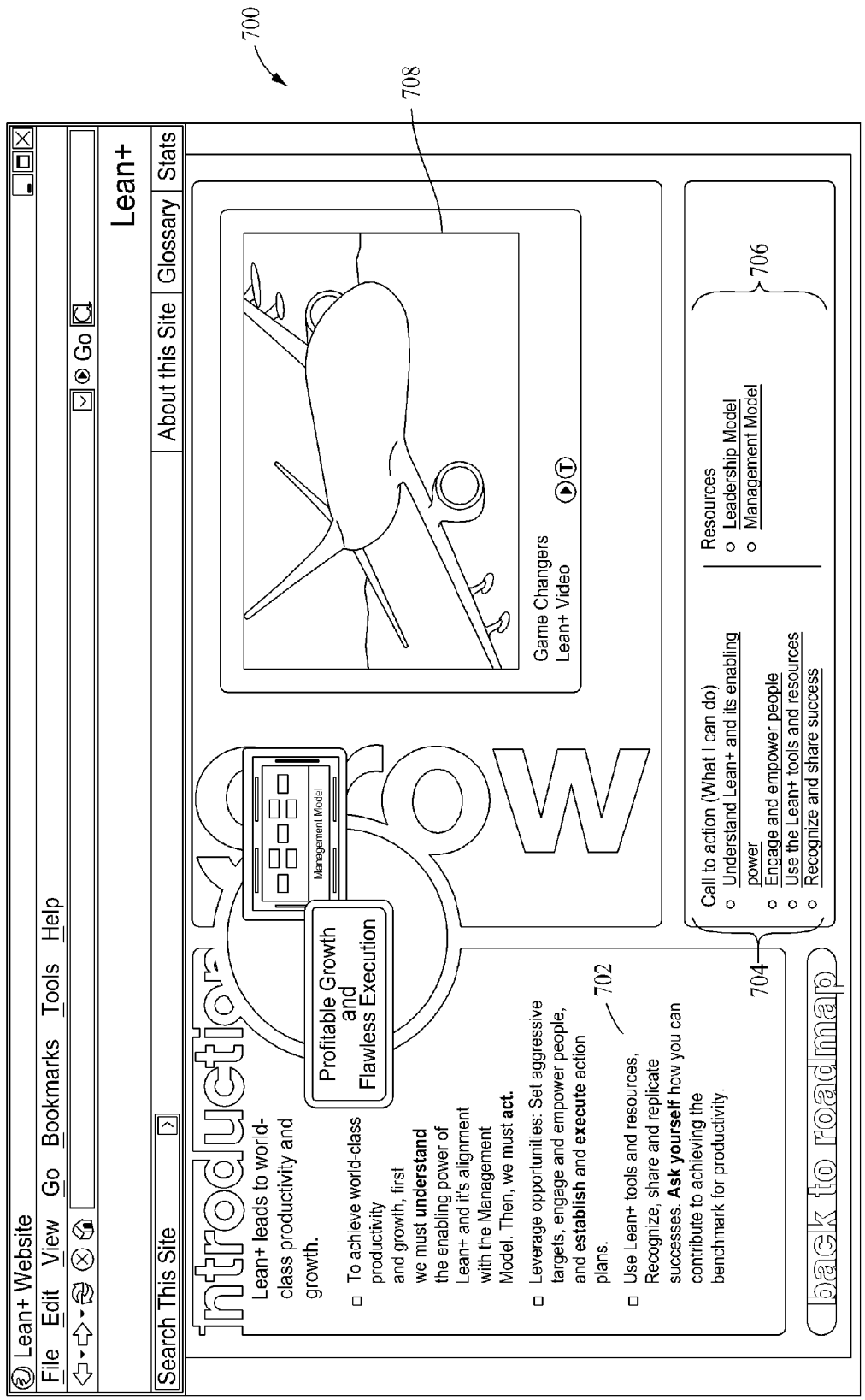
FIG. 14 is a user interface for accessing an introduction to the growth focus that forms a portion of the overarching continuous improvement approach of the enterprise.

FIG. 14 is a user interface 700 for accessing an introduction to the growth focus that forms a portion of the overarching continuous improvement approach of the enterprise. The user interface 700 is accessible from the roadmap 210 in the user interface 200 of FIG. 3 through selection of the profitable growth and flawless execution icon 320. User interface 700 includes an introduction 702 to profitability and growth for employees under the Lean+ approach, selectable calls to action 704, and selectable resources 706. An online video 708 may provide a portion of the introduction to the profitable growth and flawless execution portion of the Lean+ approach to continuous improvement.

Figure 15:
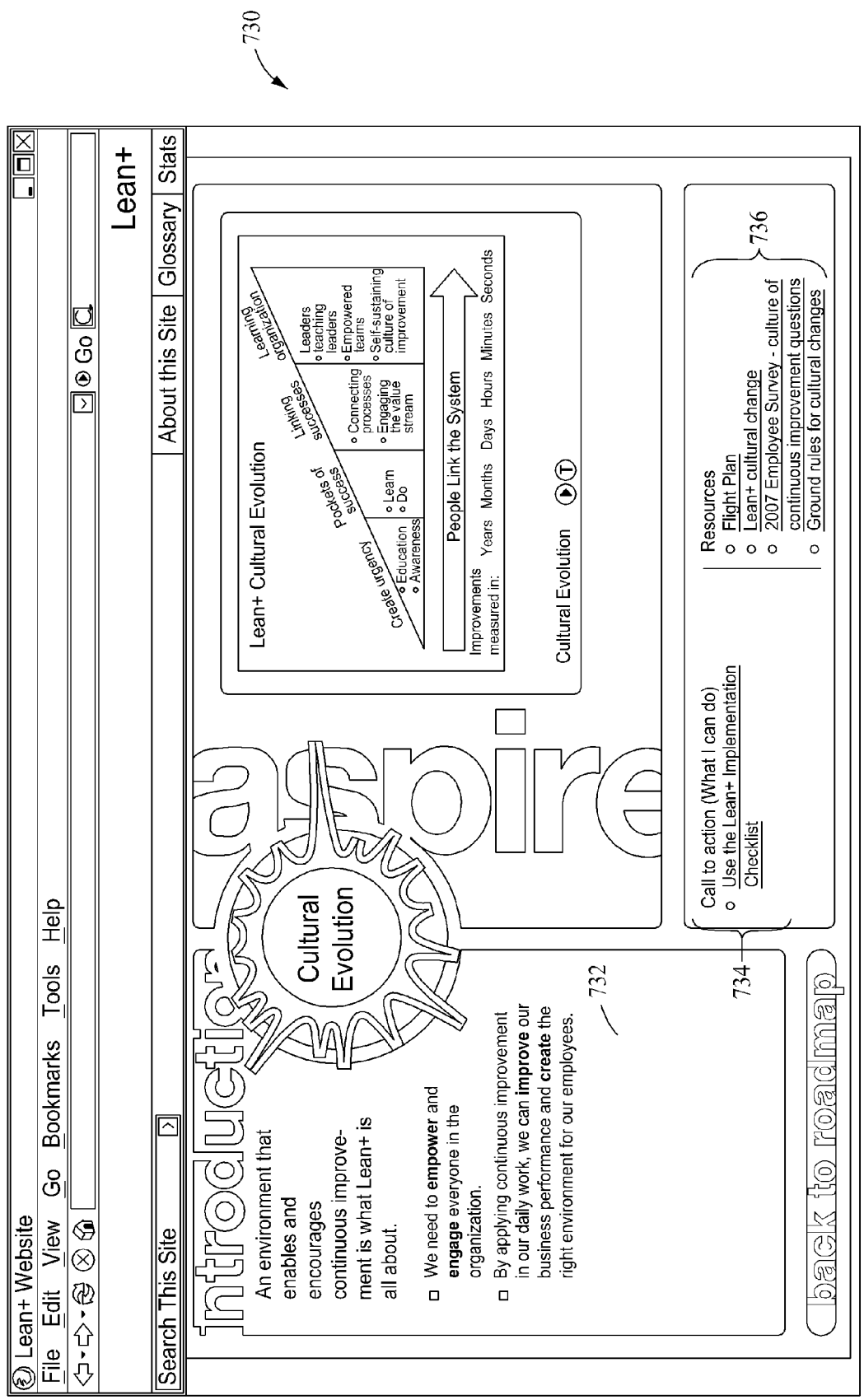
FIG. 15 is a user interface for accessing an introduction to the cultural evolution focus that forms a portion of the overarching continuous improvement approach of the enterprise.

FIG. 15 is a user interface 730 for accessing an introduction to the cultural evolution focus that forms a portion of the overarching continuous improvement approach of the enterprise. The user interface 730 is accessible from the roadmap 210 in the user interface 200 of FIG. 3 through selection of the cultural evolution icon 330. User interface 730 includes an introduction 732 to cultural changes under the Lean+ approach, selectable calls to action 734, and selectable resources 736. An online video 738 may provide a portion of the introduction to the cultural evolution portion of the Lean+ approach to continuous improvement.

Figure 16:
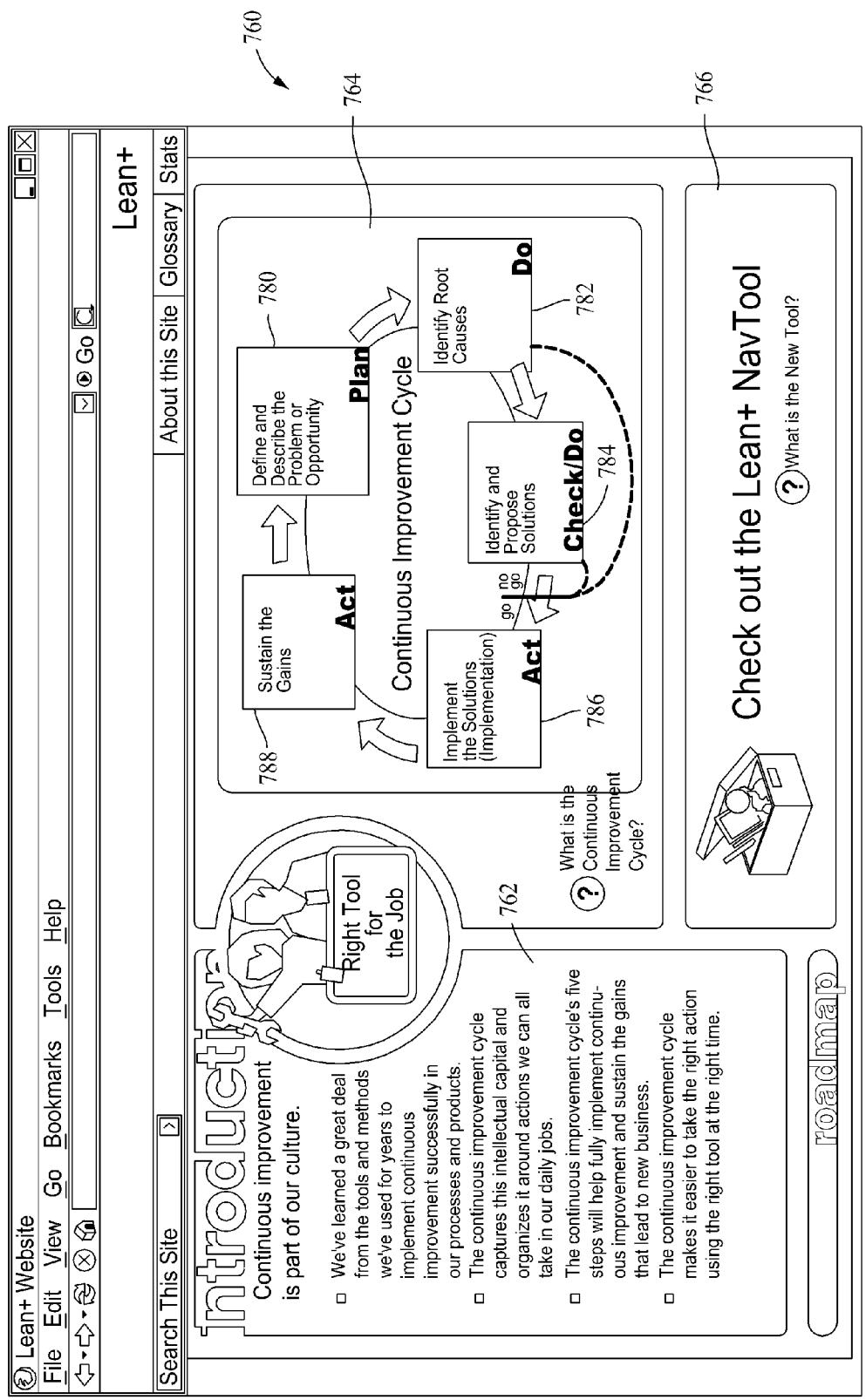
FIG. 16 is a user interface for accessing an introduction to the tool selection process that forms a portion of the overarching continuous improvement approach of the enterprise.

FIG. 16 is a user interface 760 for accessing an introduction to the tool selection processes that form a portion of the overarching continuous improvement approach of the enterprise. The user interface 760 is accessible from the roadmap 210 in the user interface 200 of FIG. 3 through selection of the right tool for the right job icon 350. User interface 760 includes an introduction 762 to tools associated with continuous improvement, an illustration of the continuous improvement cycle 674 under the Lean+ approach, and a selectable icon 766 which allows a user to check out a Lean+ NavTool.

The continuous improvement cycle 674 under the Lean+ approach includes five steps, including defining and describing the problem or opportunity 780, identifying root causes 782, identifying and proposing solutions 784, implementation of the solutions 786, and sustaining the gains 788. These steps can generally be identified in commonly utilized continuous improvement approaches. In the user interface 790 of FIG. 17, which is a user interface to the above mentioned Lean+ NavTool, these steps are selectable as shown.

The continuous improvement (CI) cycle 800 helps an enterprise by leveraging intellectual capital to solve problems and advance improvement across the enterprise. Providing the right tool for the right job is key to the cycle. The user interface 790 is one portion of a series of user interfaces that operate as a guide to the steps in dealing with a problem or making an improvement. As can be seen in the elements of CI cycle 800, a plan-do-check-act approach is taken in the development of common continuous improvement processes and tools for the enterprise.

The CI cycle 800 includes the steps of determining if you are trying to define and describe a problem, identifying root causes, identifying and testing proposed solutions, implement solutions, and working to sustain the gains, which is the effort required to reap the business benefits of the improvement.

A user interface associated with each step explains the actions to take at different stages of problem-solving and also maps the user to a set of standard tools. A user is able to follow the CI cycle 800 steps sequentially or start at the step that best matches the user's needs. If the user chosen tool does not work, or if the user is ready for the next step, the user is able to return to the cycle, via user interface 790 and continue to explore.

Go/no-go lines 810, 812 prompt a user to check a proposed solution before it is implemented. And the last step, sustaining the gains, reminds the user that achieving continuous improvement means that a solution must be implemented and validated successfully over time to sustain the gains.

Figure 17:
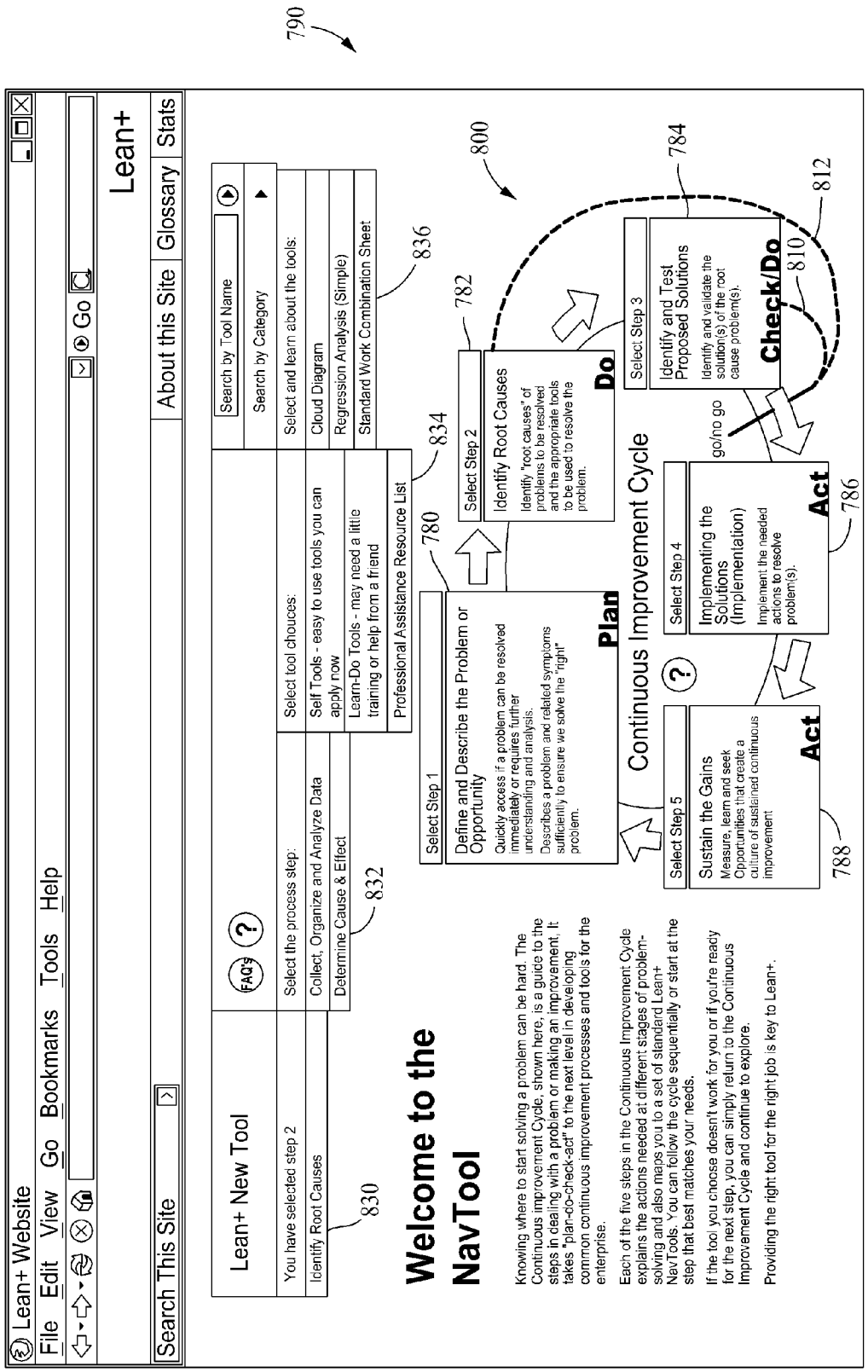
FIG. 17 is a user interface associated with a navigation tool that is selectable from the user interface of FIG. 16.

In the user interface 790 of FIG. 17, accessible from selection of the selectable icon 766 shown in FIG. 16, the user has selected the continuous improvement cycle step of identification of root causes 830 as the CI step they are at in the CI cycle 800. More particularly, by selecting (clicking on identifying root causes 782) this CI step via the user interface 790, the user is presented with drill down tool choices. One of several process steps 832 are the drill down steps associated with root cause identification and includes collection organization, and analyzing of data as well as determination of cause and effect. Tool types 834 are also presented, grouped by level of difficulty. The tool types 834 associated with root cause identification include self tools, which are easily used, learn-do tools, which may require training, and a list of professional resources. A user is also provided with a tool list 836. The tool list 836 provides a user with a list of tools to choose from that they can review in order to select the tool that is likely able to help them address their specific CI cycle issue. A search function 838 allows a user to select a specific tool if the user already knows which tool they want to use.

As is understood from the above description of user interface 790, the described Lean+ tool set is mapped to the continuous improvement cycle, allowing the user to address issues and actions at the right time using the right tool. Reviewing the entire CI cycle when working on a problem or improvement is a good way to check progress, and to continue improving even as the user or a group of employees moves forward.

The above described application also provides additional functionality to selected users, for example, administrators of the application, to maintain the information presented by the application via user interface 790. This functionality includes maintaining the tools, grouping of tools, and association of tools with the improvement cycle steps. Each of the data types can be maintained by adding, removing or altering all or part of the information about the data type listed above or by altering any associated files. Any change made by the administrators is then visible to all users of the application.

Figure 18:
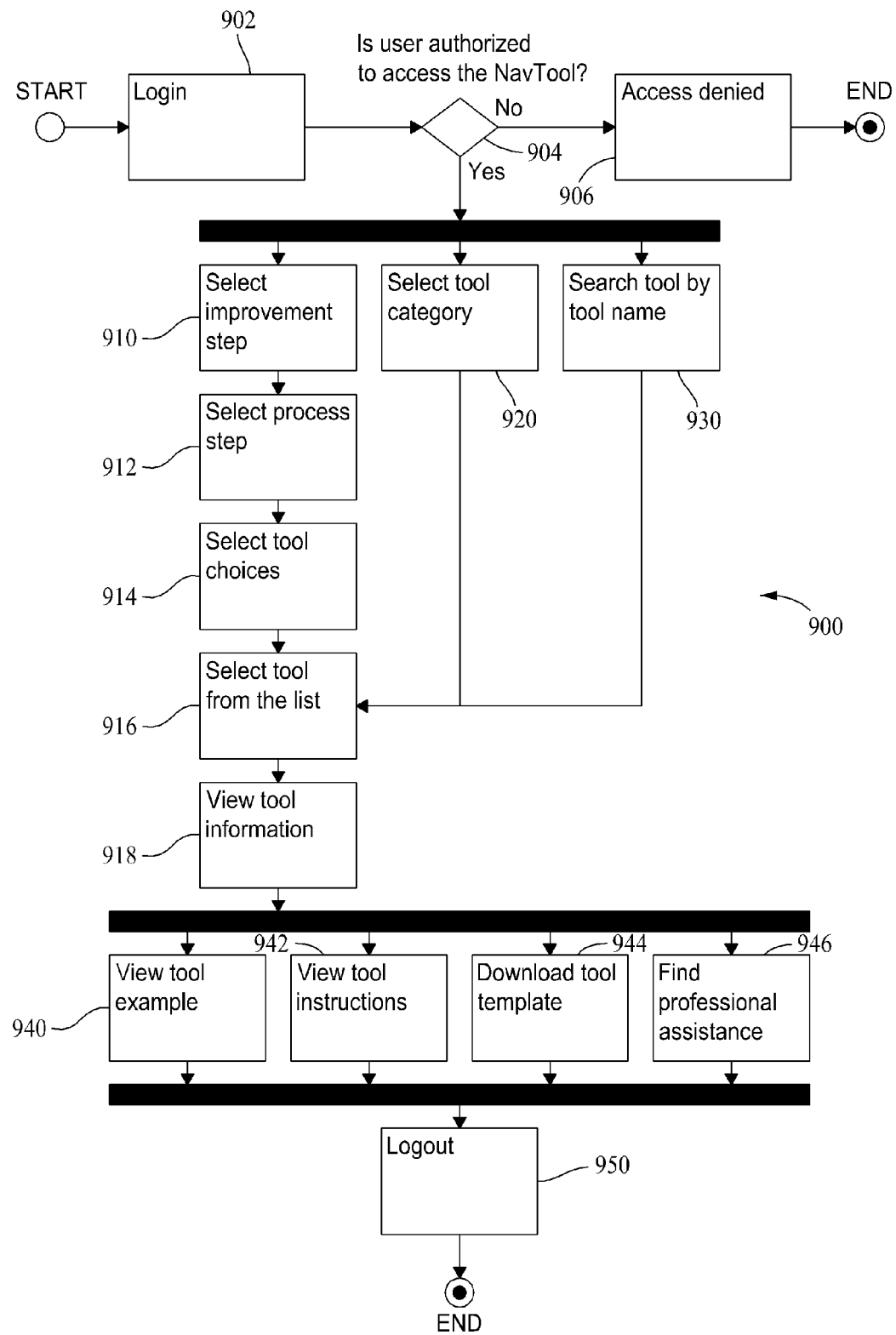
FIG. 18 is a flowchart illustrating a method for using the navigation tool described with respect to claim 17.

FIG. 18 is a flowchart 900 illustrating a method for using the navigation tool described with respect to FIG. 17. A user attempt to login 902 to the NavTool via a user interface such as has been described herein. If it is determined 904, that the user is not authorized to access the NavTool, access is denied 906 and the process ends.

After determining 904 that the user is authorized to access the NavTool, via a successful login, the user selects 910 the continuous improvement step, for example implementing the solution step, that they are interested in as described herein. As will be understood, the selection 910 results in the user being presented with a capability to select 912 a process step associated with the selected 910 continuous improvement step, and then select 914 one of the tools types associated with the process step. Selection 914 of a tool type results in the user being able to select 916 a tool from a list and then view 918 information related to the selected 916 tool.

Alternatively, after determining 904 that the user is authorized to access the NavTool, via a successful login, the user may select 920 a tool category, or may search 930 for a tool by name. Both of these user choices provide the user an opportunity to select 916 a tool from a list as described in the preceding paragraph. Whichever path is used to get to the viewing 918 of information related to the selected 916 tool, the user is able to access one or more sets of information related to the selected 916 tool. Referring again to flowchart 900, the user is able to view 940 tool information, view 942 tool instructions, download 944 a template associated with the selected tool, and find 946 professional assistance. After the user has viewed 918 the desired tool information, they logout 950 from the NavTool.

In summary, the Lean+ NavTool illustrated through FIGS. 16, 17 and 18 stratifies and organizes the tools around the continuous improvement cycle model, aligns and delivers the tools, education and training via a computing application to employees based on their need and capability. In addition, the Lean+ NavTool provides access and visibility to an integrated and structured business process while also providing a guide using a five step continuous improvement cycle that combines the "plan-do-check-act" with the continuous improvement cycle model. Each of the five steps explains the actions needed at different stages of problem-solving and also maps an employee to a set of standard continuous improvement tools. The cycle can be followed sequentially, or start at the step that best matches user needs. The Lean+ NavTool allows selection of the applicable tool to address a specific problem or opportunity and interactively reevaluates and reiterates other applicable tools thereby achieving employee education, training, engagement, and policy deployment. Finally, the Lean+ NavTool provides information on all applicable multi-discipline continuous improvement tools.

The Lean+ Roadmap serves to deploy enterprise policy using information descriptors allowing a user to gain access to multi-discipline continuous improvement information, tools, education, training, networking and resources via an enterprise intranet.

The described embodiments provide a common model and integrated approach including access to sets of multi-discipline process improvement tools, methods, education and training across the enterprise. This accelerates an entity's long-term growth and productivity, distinguishes the entity from competitors, and enables the entity to deliver customer satisfaction.

Currently utilized solutions do not provide an integrated access integrated approach with access to set of multi-discipline process improvement tools, methods, education and training across the enterprise. These problems are evidenced by the existence of lists of tools oriented around individual methods, subject matter experts aligned by continuous improvement method (Lean, TOC, Six Sigma etc.), and training is provided by a specific continuous improvement method (Lean, TOC, Six Sigma etc.).

The Lean+ NavTool is driven by a business process and information descriptors allowing a user to gain access to information, tools, templates, and resources for continuous improvement via the company intranet. All information can be downloaded by the user saved to a local computer, used real time, and used as an educational tool. The user can gain access to a list of resources to assist them.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-based method for accessing various individual tools for assisting with a problem without displaying a solution, the method implemented using a continuous improvement program from a user interface displayed at a client computer, said method comprising:

displaying, at the user interface, the continuous improvement program comprising a continuous improvement cycle that includes a plurality of selectable descriptive icons corresponding to each of a plurality of predefined continuous improvement (CI) self-explanatory cycle steps in the continuous improvement program, wherein the plurality of selectable descriptive icons are simultaneously displayed on the user interface and are selectable by the user at any time to choose a new CI self-explanatory cycle step;

displaying, at the user interface, a plurality of user selectable self-explanatory process steps applicable to the selected CI self-explanatory cycle step, wherein the plurality of user selectable self-explanatory process steps are simultaneously displayed on the user interface and are selectable by the user at any time to choose a new user selectable self-explanatory process step, wherein a selection by the user of a new CI self-explanatory cycle step changes the plurality of user selectable self-explanatory process steps to be applicable to the selected CI self-explanatory cycle step;

displaying, at the user interface, a plurality of user selectable self-explanatory tool choices applicable to the selected self-explanatory process step, wherein the plurality of user selectable self-explanatory tool choices are simultaneously displayed on the user interface and are selectable by the user at any time to choose a new user selectable self-explanatory tool choice, wherein a selection by the user of a new self-explanatory process step changes the plurality of user selectable self-explanatory tool choices to be applicable to the selected self-explanatory process step, and wherein the plurality of descriptive icons, the plurality of user selectable self-explanatory process steps, and the plurality of user selectable self-explanatory tool choices are simultaneously displayed on the user interface; and generating, upon receiving a user selection of one of the self-explanatory tool choices, at least one interactive user interface that provides access to an example of the selected self-explanatory tool choice for assisting with a problem without displaying a solution and instructions relating to the use of the selected self-explanatory tool choice.

2. A computer-based method according to claim 1 further comprising generating a user interface configured to provide the user an option to download a template relating to the selected tool choice.

3. A computer-based method according to claim 1 wherein generating at least one interactive user interface that provide instructions relating to the use of the tool choice comprises providing a user interface that includes a professional assistance resource list relating to the selected tool choice.

4. A computer-based method according to claim 3 wherein the professional assistance resource list relating to the selected tool choice includes a list of subject matter experts aligned by specific continuous improvement methodology.

5. A computer-based method according to claim 1 further comprising providing, in at least one user interface, a capability for a user to initiate a name based tool search.

6. A computer-based method according to claim 1 verifying the user has authorization to access at least one of the various individual tools.

7. A system configured to provide interactive user navigation to individual tools for assisting with a problem without displaying a solution from a continuous improvement program, said system comprising:

a server configured to store electronic information, wherein the stored electronic information includes one or more of files and references to files that contain data corresponding to each step in a continuous improvement program that enhances quality and productivity across multiple disciplines within an enterprise; and a client computer configured to:

display a graphical user interface (GUI) to a user to access the individual tools through a continuous improvement cycle that includes a series of selectable descriptive icons, the series of selectable descriptive icons including each predefined continuous improvement (CI) self-explanatory cycle steps in the continuous improvement program, wherein the series of selectable descriptive icons are simultaneously displayed in said GUI and are selectable by the user at any time to choose a new CI self-explanatory cycle step;

display, in said GUI, descriptive process step icons associated with a selected CI self-explanatory cycle step, wherein the descriptive process step icons are simultaneously displayed on said GUI and are selectable by the user at any time to choose a new process step, wherein a selection by the user of a new CI self-explanatory cycle step changes the descriptive process step icons to be applicable to the selected CI self-explanatory cycle step;

display, in said GUI, descriptive tool choice icons associated with a selected self-explanatory process step, and cause access to an example of the tool choice and instructions relating to the use of the tool choice to be displayed at said GUI upon receipt of a self-explanatory tool choice via said GUI, wherein the descriptive tool choice icons are simultaneously displayed in said GUI and are selectable by the user at any time to choose a new tool choice, wherein a selection by the user of a new process step changes the descriptive tool choice icons to be applicable to the selected process step, and wherein the series of selectable descriptive icons, the descriptive process step icons, and the descriptive tool choice icons are simultaneously displayed on a single GUI.

8. A system according to claim 7 wherein said client computer is programmed to generate a user interface for display on said GUI, the user interface operable to provide the user an option to download a template relating to a selected tool choice.

9. A system according to claim 7 wherein said client computer is programmed to generate a user interface for display on said GUI, the user interface including a professional assistance resource list relating to a selected tool choice.

10. A system according to claim 9 wherein the professional assistance resource list includes a list of subject matter experts aligned by specific continuous improvement methodology.

11. A system according to claim 7 wherein said client computer is programmed to generate a user interface for display on said GUI, the user interface providing a capability for a user to initiate a name based tool search.

12. A computer-based method according to claim 1, wherein the CI cycle steps facilitate achieving employee education, training, engagement, and policy deployment.

13. A computer-based method according to claim 1, further comprising displaying at least one go/no go line between two descriptive icons of the plurality of descriptive icons, wherein the at least one go/no go line prompts a user to check a proposed solution before the solution is implemented.

14. A computer-based method according to claim 1, further comprising:
   explaining, via the user interface, actions needed at different stages of problem-solving; and
   mapping the user to a set of continuous improvement tools.

15. A computer-based method according to claim 1, wherein the user interface further provides education and training for the plurality of user selectable self-explanatory tool choices comprising:
   allowing selection of an self-explanatory tool choice to address a specific problem or opportunity; and
   interactively reevaluating and reiterating other applicable self-explanatory tool choices that could be utilized by the user.

\* \* \* \* \*